US009927529B2

United States Patent
Morin et al.

(10) Patent No.: US 9,927,529 B2
(45) Date of Patent: Mar. 27, 2018

(54) PROGRAMMABLE BUOY SYSTEM

(71) Applicants: Matthew P. Morin, Detroit, MI (US);
Kevin J. Morin, Detroit, MI (US)

(72) Inventors: Matthew P. Morin, Detroit, MI (US);
Kevin J. Morin, Detroit, MI (US)

( * ) Notice: Subject to any disclaimer, the term of this patent is extended or adjusted under 35 U.S.C. 154(b) by 0 days.

(21) Appl. No.: 15/194,020

(22) Filed: Jun. 27, 2016

(65) Prior Publication Data
US 2016/0378107 A1 Dec. 29, 2016

Related U.S. Application Data

(60) Provisional application No. 62/184,474, filed on Jun. 25, 2015.

(51) Int. Cl.
G01S 19/42 (2010.01)
B63B 22/16 (2006.01)
(Continued)

(52) U.S. Cl.
CPC .............. G01S 19/42 (2013.01); B63B 22/16 (2013.01); G01S 1/725 (2013.01); G05D 1/0027 (2013.01);
(Continued)

(58) Field of Classification Search
CPC ......... G01S 19/42; G01S 1/725; B63B 22/16; B63B 2035/008; B63B 2035/009; G05D 1/0027; G05D 1/0044; G05D 1/0208
(Continued)

(56) References Cited

U.S. PATENT DOCUMENTS 5,577,942 A 11/1996 Juselis
5,731,788 A 3/1998 Reeds
(Continued)

FOREIGN PATENT DOCUMENTS

WO 03104835 A2 12/2003

OTHER PUBLICATIONS

"Tucson tech: Storm-tracking craft test waters here". David Wichner. Feb. 26, 2013. Printed May 27, 2015. http://tucson.com/business/local/tucson-tech-storm-tracking-craft-test-waters-here/article_0531f0a3-3834-59f3-a506-6f0f1eae819b.html?print=true&cid=print. 3 pages.
(Continued)

Primary Examiner — Anne M Antonucci
Assistant Examiner — James E Stroud
(74) Attorney, Agent, or Firm — Gregory L. Ozga; Warn Partners, P.C.

(57) ABSTRACT

A programmable buoy system having one or more buoys capable of connecting through the internet to a buoy command server. The buoy command server relays commands to each of the one or more buoys in response to user commands sent from a buoys command interface application on a mobile device. The programmable buoy system includes one or more buoys each having a hull with two or more pontoons where the hull has a top side and bottom side. A stationary rudder extends downward from the bottom side of the hull to be positioned in a body of water when the one or more buoys are in use. A motor is pivotably connected on each one or more buoys, wherein the motor has a propeller positioned away from the bottom side of the hull. The propeller and motor move the select one of the one or more buoys in the body of water.

22 Claims, 8 Drawing Sheets

(51) Int. Cl.
    *G05D 1/00*     (2006.01)
    *G01S 1/72*     (2006.01)
    *G05D 1/02*     (2006.01)
    *B63B 35/00*    (2006.01)

(52) U.S. Cl.
    CPC ......... *G05D 1/0044* (2013.01); *G05D 1/0208* (2013.01); *B63B 2035/008* (2013.01); *B63B 2035/009* (2013.01)

(58) Field of Classification Search
    USPC .......................................................... 701/2
    See application file for complete search history.

(56) References Cited

U.S. PATENT DOCUMENTS

| | | | |
|---|---|---|---|
| 6,520,105 B2 | 2/2003 | Koda et al. | |
| 6,854,406 B2 | 2/2005 | Cardoza et al. | |
| 7,789,723 B2 | 9/2010 | Dane et al. | |
| 8,882,555 B2 | 11/2014 | Mulligan et al. | |
| 2005/0048918 A1* | 3/2005 | Frost | A63H 30/04 455/41.2 |
| 2007/0203623 A1* | 8/2007 | Saunders | G05D 1/0206 701/23 |
| 2009/0132101 A1* | 5/2009 | Gizara | B63J 99/00 701/2 |
| 2010/0131133 A1 | 5/2010 | Koda et al. | |
| 2012/0006277 A1 | 1/2012 | Troy et al. | |
| 2012/0067268 A1* | 3/2012 | Guerrero | G01V 3/12 114/321 |
| 2015/0346726 A1* | 12/2015 | Davoodi | B63B 22/24 701/21 |
| 2015/0356482 A1* | 12/2015 | Whipple | G06Q 50/06 705/7.23 |
| 2015/0370252 A1* | 12/2015 | Hanson | B63B 1/32 701/2 |

OTHER PUBLICATIONS

Hydronalix. Printed Jun. 23, 2016. "New Technology Concepts for Maritime Robotics". https://hydronalix.com/about/. 1 page.
EMILY. Printed Jun. 23, 2016. "Introducing EMILY, the Emergency Integrated Lifesaving Lanyard". http://emilyrobot.com. 2 pages.
Hydronalix. Printed Jun. 23, 2016. Autonomous Mobile Buoy. https://hydronalix.com/amb/. 1 page.

* cited by examiner

PROGRAMMABLE BUOY SYSTEM

CROSS-REFERENCE TO RELATED APPLICATIONS

This application claims the benefit of U.S. Provisional Application No. 62/184,474, filed Jun. 25, 2015. The disclosure of the above application is incorporated herein by reference.

FIELD OF THE INVENTION

The present invention relates to motorized buoy remotely controllable through the Internet using a wireless cellular signal and a designated website.

BACKGROUND OF THE INVENTION

In the field of sailboat racing a designated course is set up prior to the race using a number of different buoys. During the course of the race the boats are expected to sail around the buoys in a particular order, concluding the rate at a finish line buoy defined by an invisible line between the finish line buoy and a race committee boat or race committee location such as a dock, if the race committee is located on land. During the process of setting up the buoys to defined the course, the buoys are often placed by using work boats that drive to a designated location and then release or anchor the racing buoy in place. As a result the buoys are often placed out on the course hours before the race starts. In the case of regattas (i.e. engthy events where multiple races are held in a single day or days) the buoys can be out almost a half day before the final races start. Many types of races involve trying to place the buoys at a Windward and Leeward directions relative to the race committee position. However during the course of the day wind direction is constantly changing and will require the buoys to be repositioned manually by the persons on the work boats. It is desirable to reduce the time between course set up and the start of the race. It is also desirable to provide a system that will eliminate the need to manually reposition the buoys for a race.

Also in the maritime field navigational charts of bodies of water help boat operators know the approximate depth of the water at a specific latitude and longitude. However many navigational charts rely on old data, which at times can be decades if not centuries old. Also some bodies of water have never been charted and have no navigational charts. The reason for the outdated or on charted bodies of water is that it often times takes a large amount of resources to chart a body of water. Historically this was done by a charting boat surveying a body of water or a portion of a body of water, wherein the crew of the charting boat would take depth measurements a different points. More modern navigational charts are prepared using sonar technology where bodies of water are mapped by a sonar boat which requires a boat or vessel with a crew to navigate the body of water and collect the needed data from a sonar connected to the boat. For smaller bodies of water the above approaches are not always practical due to the expense and time needed to map the body of water, therefore navigational charts are sometimes unavailable. It is therefore desirable to develop new systems for charting bodies of water that do not require as many resources as the more traditional methods.

SUMMARY OF THE INVENTION

A programmable buoy system having one or more buoys capable of connecting through the internet to a buoy command server hosting a buoy command website. The buoy command server relays commands to each of the one or more buoys in response to user commands sent from a buoy command interface application on a mobile device or computer. The programmable buoy system includes one or more buoys each having a hull with two or more pontoons, where the hull has a top side and bottom side. A stationary rudder extends downward from the bottom side of the hull to be positioned in a body of water when the one or more buoys are in use. A motor is pivotably connected on each one or more buoys, wherein the motor has a propeller positioned away from the bottom side of the hull. The propeller and motor move one or more buoys in the body of water.

Each of the one or more buoys includes electronic hardware that allows for autonomous and wireless operation of each buoy. The hardware on each buoy includes a global positioning controller, a computer with a wireless internet communicator and a power source. The global positioning controller is connected to the motor and has a communication port, wherein the global controller uses a global positioning system to navigate the buoy to one or more waypoints in response to a command received at the communication port of the global positioning controller. The global positioning controller also controls the movement of the select one of one or more buoys to maintain position at the one or more waypoints.

The computer has a wireless internet communicator that provides an Internet connection using a wireless network. The computer is hard wired to the communication port of the global positioning controller so that the computer connects to the Internet through the wireless internet communicator and receives one or waypoints through the Internet from the buoy command website. The one or more waypoints are stored by the computer and then inputted in a desired sequential order through the communication port to the global positioning controller. The computer also receives current buoy location information from the global positioning controller in the form of current latitude and current longitude readings so that the computer will monitor when the buoy is at the one or more waypoints. The current latitude and current longitude readings are then communicated to the buoy command website so that the user can see current latitude and current longitude readings for the buoy on the buoy command interface application. A power source is connected to the computer, motor and global positioning controller to supply power to all of the components.

The programmable buoy system further includes the buoy command server connected to the Internet for hosting the buoy command website used to register the one or more buoys belonging to the user and allows the user to relay the one or more waypoints to each of the one or more buoys. The buoy command server hosts many buoy command websites for different users. The relaying of the one or more waypoints is accomplished by using the buoy command website to transmit the one or more waypoints to the computer through the Internet using the wireless internet communicator and the mobile network.

The programmable buoy system further includes a buoy command application on a mobile device or a personal computer that connects to the buoy command website on the buoy command server, wherein the buoy command application is used to communicate the one or more waypoints to the buoy command website.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 5:
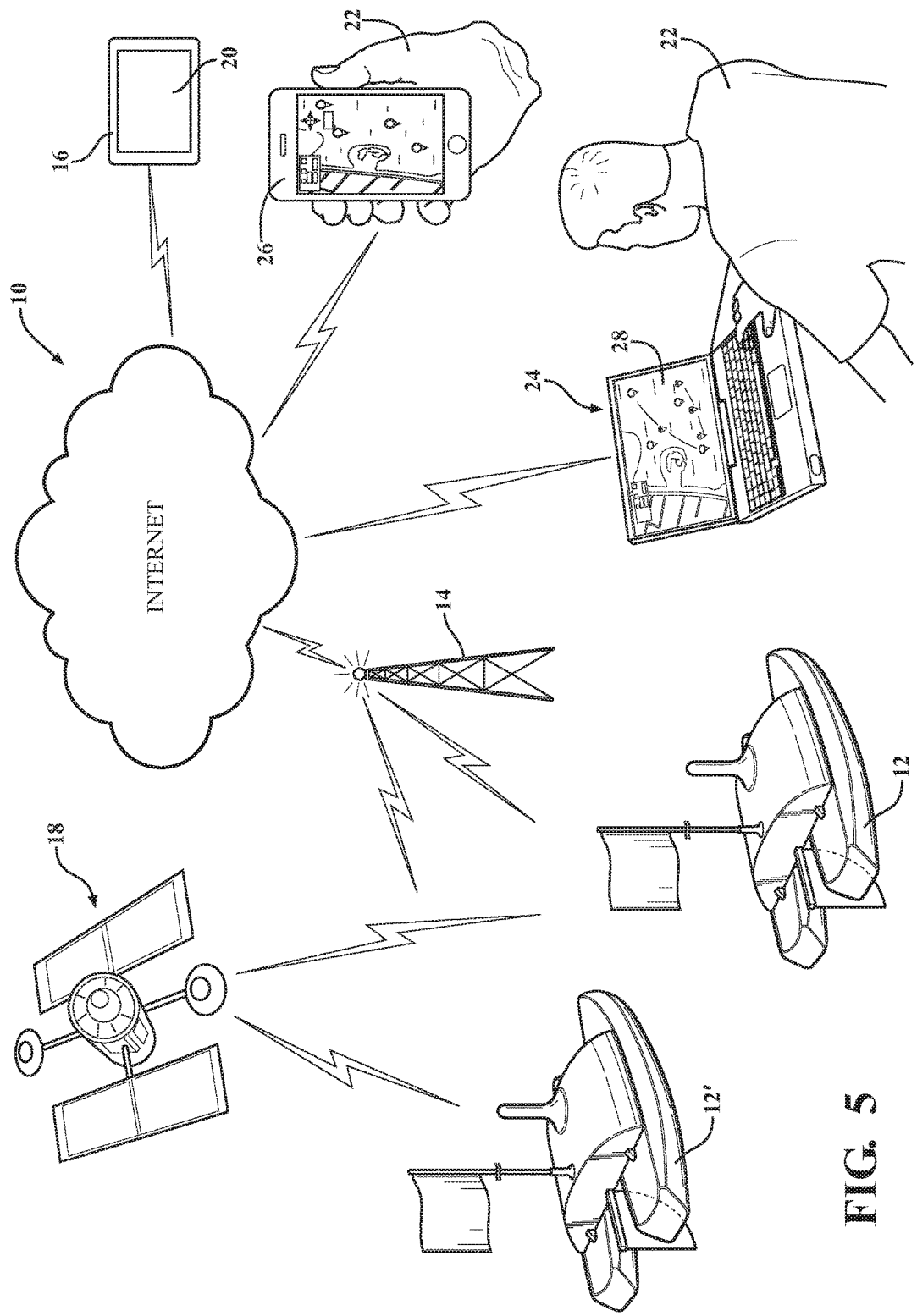
FIG. 5 is a schematic view showing the communication paths of the programmable buoy system in accordance with the present invention.

Referring now to FIG. 5, a programmable buoy system 10 is schematically shown. In particular one or more buoys 12, 12' are shown communicating to a mobile network tower 14 connected to a buoy command server 16 located on the Internet. The buoy 12, 12' also wirelessly connects to a navigational system 18, which is shown as a satellite. The navigational system 18 can be a global positioning system that is satellite-based or can be accomplished by using other navigational system such as Loran® or by using a cellular or mobile network tower 14 or towers to triangulate a position. The buoy command server 16 hosts a buoy command website 20 used to register the one or more buoys 12, 12' belonging to a user 22. The buoy command server 16 hosts multiple buoy command websites to allow users private access to their buoys. The user 22 can send commands or instructions to the one or more buoys 12, 12' by using a personal computer 24 or a mobile device 26 such as a smart phone, tablet or other device. The personal computer 24 or mobile device have a buoy command interface application 28 running thereon for communicating to the buoy command website 20.

Referring now to FIGS. 2, 3, 7 and 8 the details of the one or more buoys 12, 12' are shown and described. Each of the one or more buoys 12, 12' has a hull 30, which is defined as the main body of a vessel, including the bottom, sides and deck but not including masts, superstructure, rigging, engines and other fittings. The hull 30 has a top side 32 and bottom side 34. The one or more buoys 12, 12' in accordance with the present embodiment of the invention are a catamaran style hull 30 design that includes at least two pontoons 36, 36'. Extending between the pontoons 36, 36' is a deck 38 having a connectable housing 40. In the present embodiment of the invention the electronic components, including the controls are positioned on the deck 38 and are covered by the housing 40 which provides a watertight seal to protect the components from getting wet. The housing 40 also optionally includes a foam surface layer, which serves to prevent damage to the buoy 12, 12' and another vessel in the event of a collision. It is also within the scope of this invention for the electronic components to be positioned within compartments formed in the at least two pontoons 36, 36' in order to provide a lower weight distribution of the buoy 12, 12'.

Extending from the top side 32 is a flag mount 42 formed on or connected to the housing 40 that is used to hold a flag 44 that extends upward from the buoy 12, 12' in order to make the buoy 12, 12' more visible to other watercraft. The flag 44 also serves a purpose in sailboat racing since the boat participating in the race must round the buoy 12, 12' during the race. For a racing sailboat the location of the buoy is necessary in order to determine a proper course for sailing to the buoy 12, 12'.

Figure 8:
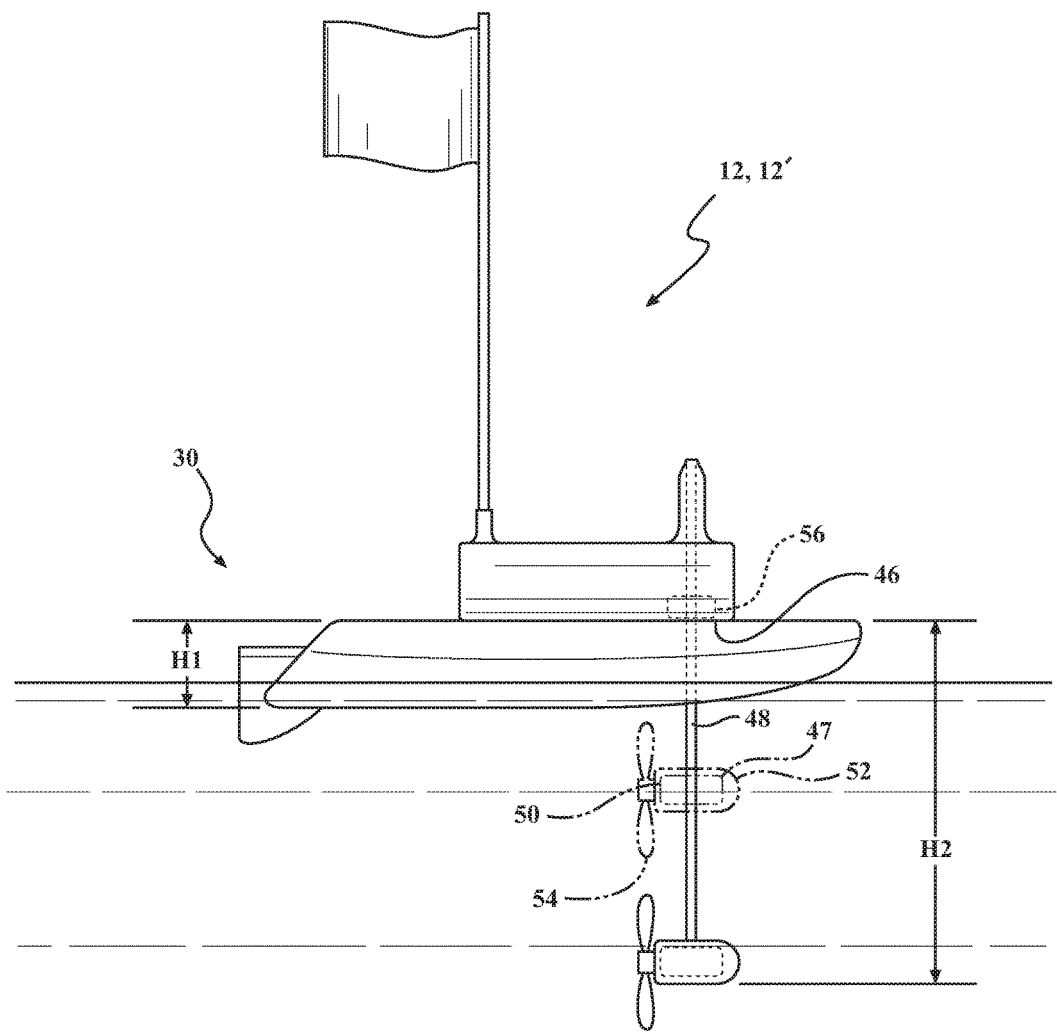
FIG. 8 is a side plan view of the buoy on a body of water.

Referring now to FIG. 8, each buoy 12, 12' has a motor 46 with a shaft 48 and connection point 56 connected to the deck 38. The shaft 48 extends downward from the bottom side 34 of the one or more buoys 12, 12' and connects to a motor housing 52 of the motor at a first end of the shaft 48. The motor 46 further includes the motor housing 52, a propeller 54 that is connected to a spindle 50, that connects to an actuator 47 located in the motor housing 52 of the motor 46. The propeller 54 and spindle 50 are configured to rotate with respect to the motor housing 52 and actuator 47, which propels the buoy 12, 12' throught he body of water.

Figure 7:
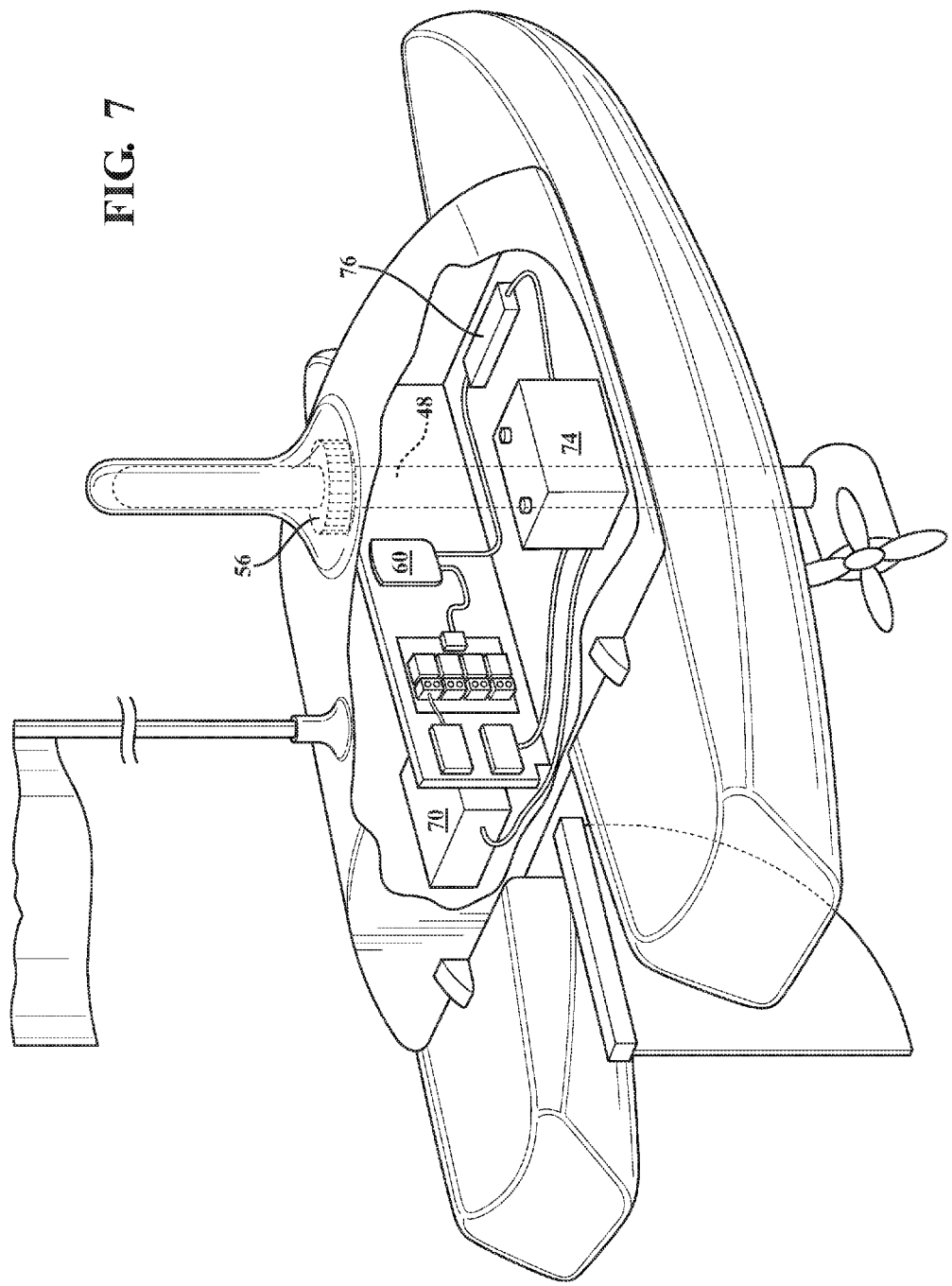
FIG. 7 is a partially sectioned rear perspective view of the buoy.

The motor housing 52, propeller 54 and actuator 47 provide a significant amount of weight located beneath the bottom side 34 of the buoy 12, 12'. This distribution of weight helps to provide stability to the buoys 12, 12' when encountering waves on a body of water or other forms of instability. The stability is attributable to what is referred to as the ratio of maximum motor height to buoy height. This is shown in FIG. 7 where in the buoy height H1 is defined by the distance between the bottom surface 34 to a top surface of the pontoons 36, 36', which is the level of the deck 38. The maximum motor height H2 is defined by the distance between the connection point 56 of the shaft 48 to a bottom surface of the motor housing 52 when the shaft 48 is fully extended. Perpendicular to the bottom surface 34 of the buoy 12, 12'. It is within the scope of the present invention for the ratio of maximum motor height to buoy height to have different ranges depending on a particular application. In particular it is within the scope of this invention for the ratio to be at least 2:1, at least 2.25:1, at least 2.5:1, at least 2.75:1, at least 3.0:1, at least 3.25:1, at least 3.5:1, at least 3.75:1, at least 4.0:1, at least 4.25:1, at least 4.5:1 and at least 4.75:1.

It is also within the scope of this invention for the buoy 12, 12' to have a vessel volume calculated by multiplying the distance from the bottom of the pontoons 36, 36' to the top of the deck 38, by the length of the pontoons 36, 36' multiplied by the width of the buoy measuring from the outer side of one pontoon 36 to the outer side of the other pontoon 36'. Depending on a particular application the buoys 12, 12' will have different vessel volumes however is within the scope of this invention for the buoy 12, 12' to have a vessel volume of one of the following: less than 0.90 m³, less than 0.80 m³, less than 0.70 m³, less than 0.60 m³, less than 0.50 m³, and less than 0.40 m³. The significance of the vessel volume and the ratio of maximum motor height to the buoy height helps to quantify the factors that promote the stability and maneuverability of the buoy 12, 12'. Placing the motor 48 so far beneath the bottom surface of the buoy 12, 12' helps the buoy maintain its position and prevents capsizing since the source of propulsion for the buoy and a significant amount of weight is located well underneath the buoy 12, 12'. When considering the distance of the propeller 54 to the buoy height and buoy volume, the buoy 12, 12' has unique advantages over many other watercraft. For example if the motor 46 was connected to a shaft 48 on a much larger boat, for example a fishing boat the motor would have to be 2 or 3 times deeper below the bottom surface of the vessel to achieve the same stability.

Figure 3:
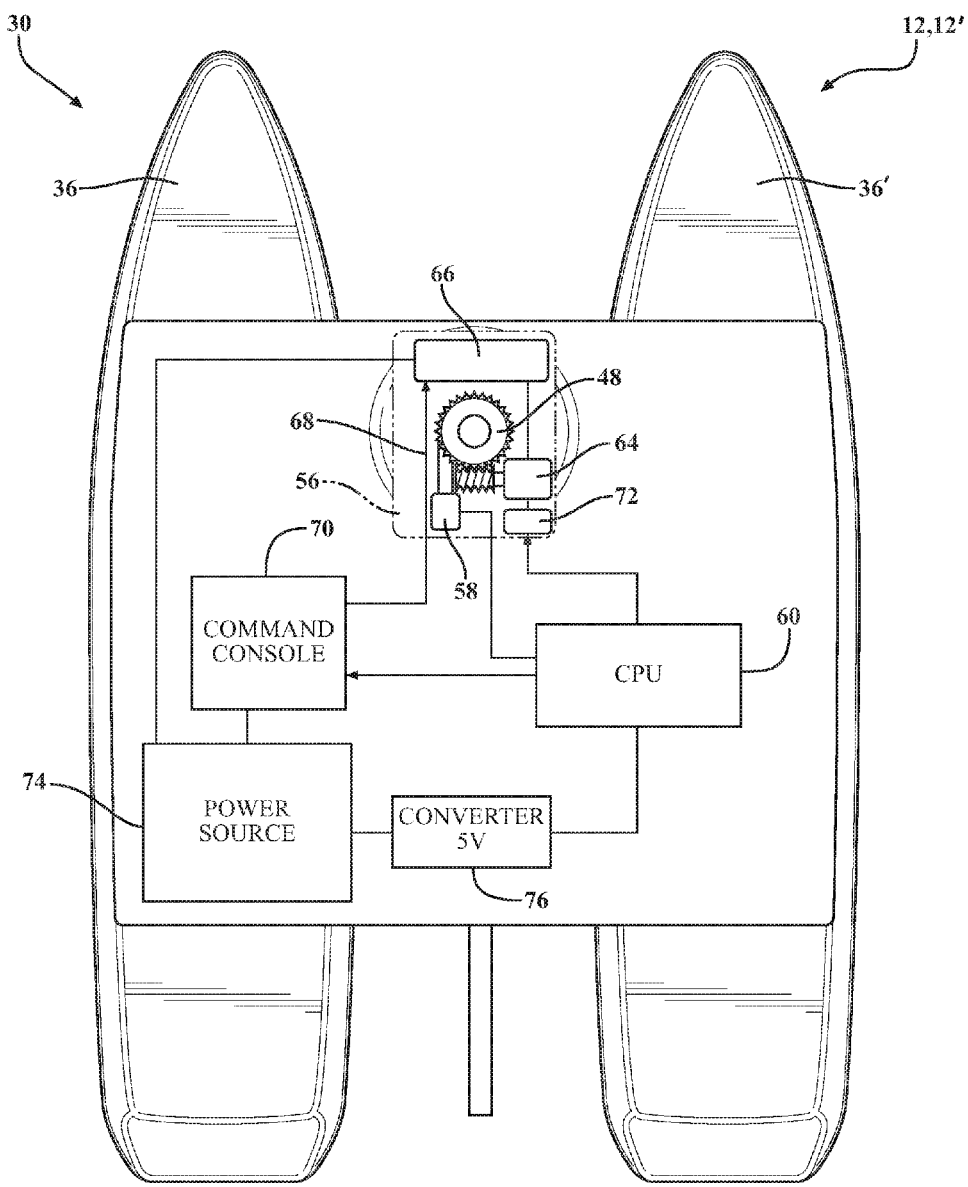
FIG. 3 is a top schematic view of the programmable buoy of the present invention.

As shown in FIG. 8 the shaft 48 is vertically adjustable to move the motor 46 to different vertical distances relative to the bottom side 34. The vertical adjustments can be made in order to account for shallow waters or calmer weather conditions for the buoy 12, 12' which will allow the buoy 12, 12' to be able to move more quickly if the shaft 48 is not fully extended. The vertical adjustment of the shaft 48 is accomplished using a actuator located at the connection point 56 which as shown in FIG. 3 includes a vertical actuator 58 that receives commands from a computer 60 on the buoy 12, 12', the control and operation of which will be discussed in greater detail below. Another feature of the invention shown in FIG. 3 and FIG. 8 is a rudder 62 that works in connection with the motor 46 in order to allow the propeller 54 to flow water past the rudder 62 so that the buoy 12, 12' will have more steer ability.

In order to steer or drive the buoy 12, 12' the shaft 48 connected to the motor 46 is able to rotate about the axis of the shaft 48. The pivoting or rotation of the shaft 48 is accomplished by a steering actuator 64 shown in FIG. 3 that is part of the connection point 56. When the shaft 48 rotates the motor 46 rotates so that the propeller 54 rotates with the motor 46 and causes the buoy 12, 12' to move or steer through the body of water.

Referring now to FIGS. 3 and 7 the electronic components of the buoy 12, 12' are shown and described. Each buoy 12, 12' has a global positioning controller 66 that is connected to the steering actuator 46 that is part of the motor 46. In this particular embodiment the global positioning controller 66 is located within the connection point 56 of the motor 46, however it is within the scope of this invention for the GPS controller 66 to be located at a different location and capable of providing signals to the steering actuator 64. The steering actuator 64 is an actuator having a worm gear meshed with a gear connected to the shaft 48. The global positioning controller 66 has a communication port 68 that connects to a command console 70 that sends instructions to the global positioning controller 66. It is within the scope of this invention for the global positioning controller 66 and the navigation command console 70 to be integrated into a single unit. However the purpose of the navigation command console 70 is to communicate waypoints to the global positioning controller 66. The global positioning controller 66 connects to a navigational system such as a global positioning system or other system capable of receiving latitude and longitude coordinates, which are then relayed through the navigational command console 70 back to a computer 60 located on the buoy 12, 12'. The global positioning controller 66 also stores a desired single waypoint command that is transmitted from the computer 60 to the navigational command console 70 and then relayed to the global positioning controller 66, which then causes the global positioning controller 66 to steer the buoy 12, 12' with the steering actuator 64 to the selected waypoint. The global positioning controller 66 stores only a single waypoint and will maintain the waypoint position at the last known or instructed waypoint in the event of failure of the computer 60 or loss of wireless connection of the computer 60 with the wireless network 14.

The computer 60 has a wireless Internet communicator capable of providing the connection to the wireless network 14 described above. The computer 60 is hardwired to the communication port 68 of the global positioning controller 66 by way of the navigational command console 70. The computer 60 transmits and stores desired waypoint commands which can then be expressed in a desired sequence by continuously monitoring and communicating to the GPS controller 60 the current waypoint as well as proceeding to a second waypoint if the current waypoint is reached. Waypoints as used in this invention are defined to be latitude and longitude numbers that are expressed as waypoints and suggested waypoints. Also latitude and longitude is used by the GPS controller 66 to relay actual latitude and longitude positions to the computer 60 by using the communication port 68. How the computer 60 receives waypoint commands will be described in greater detail below.

The motor 46 also has a speed controller 72 which receives speed commands from the computer 60. The speed commands are instructions from the user 22 received by the computer 60 which will be described in greater detail below.

The buoy 12, 12' also has a power source 74 which in the present application is a 12 V direct-current marine battery. The power source 74 supplies power to the GPS controller 66, command console 70, motor 46, including the steering actuator 64 and vertical actuator 58 all in the form of 12 volt (V) power. The computer 60 receives power from the power source 74 however a 5 volt (V) converter 76 is placed between the power source 74 and the computer 60. The 5 V converter converts the 12 V power to 5 V which is then supplied to the computer 60 by way of a universal serial bus (USB) connection.

The computer 60 has a wireless Internet communicator that is capable of connecting to the Internet through a mobile network 14 to reach the Internet where communication can be made with the buoy command server 16. A user 22 can express one or more desired waypoint commands to the buoy 12, 12' either using the personal computer 24 connected to the Internet or by using the mobile device 26 having the buoy command interface application 28 operating thereon. The buoy command interface application 28 is a software application that is downloaded and run on the personal computer 24 of mobile device, or it can be uploaded as a web based software interface directly from the buoy command server 16.

Figure 1:
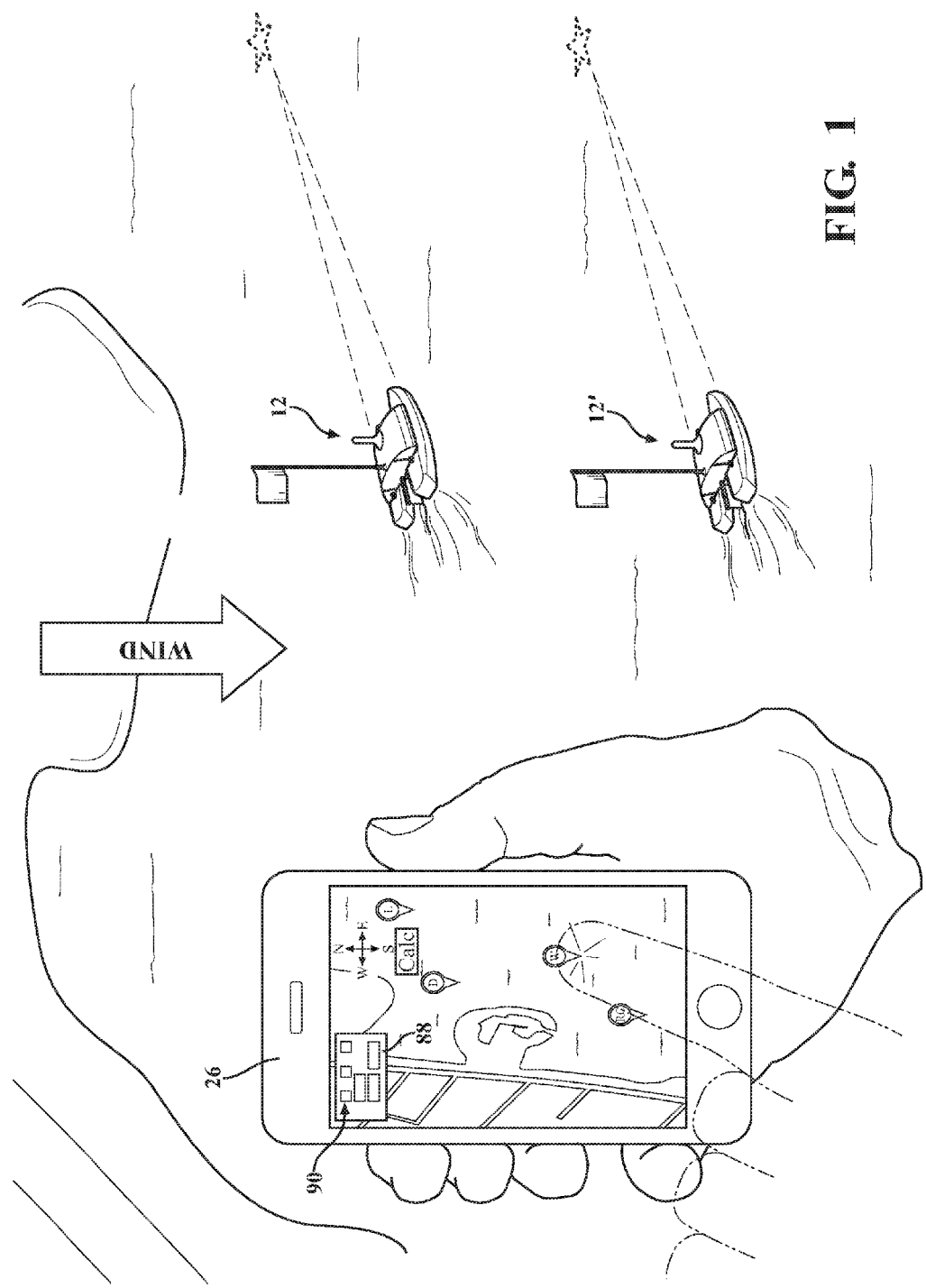
FIG. 1 is a schematic view of the programmable buoy system controlled by a mobile device.
Figure 2:
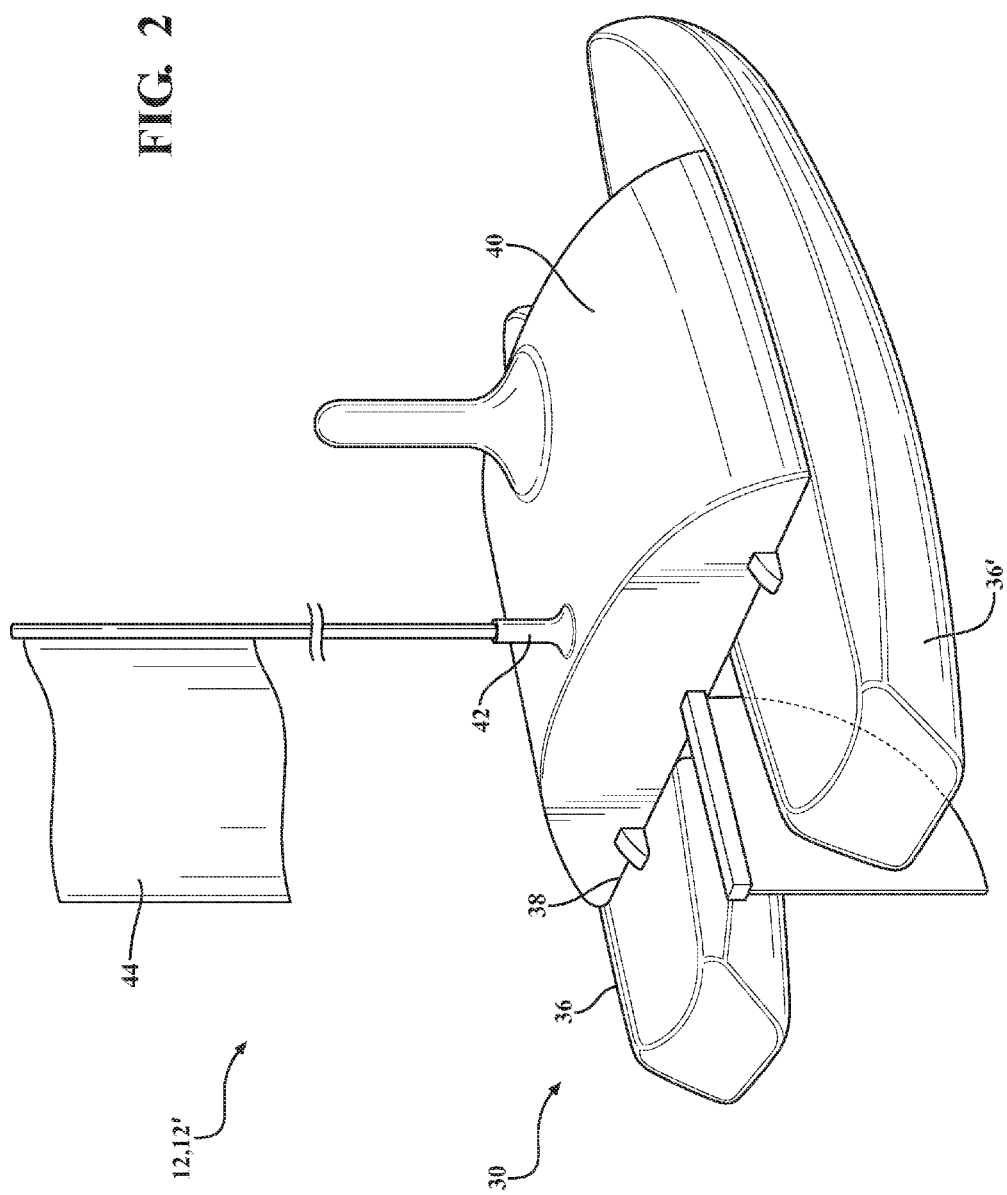
FIG. 2 is a perspective rear side view of the buoy in accordance with the present invention.
Figure 4:
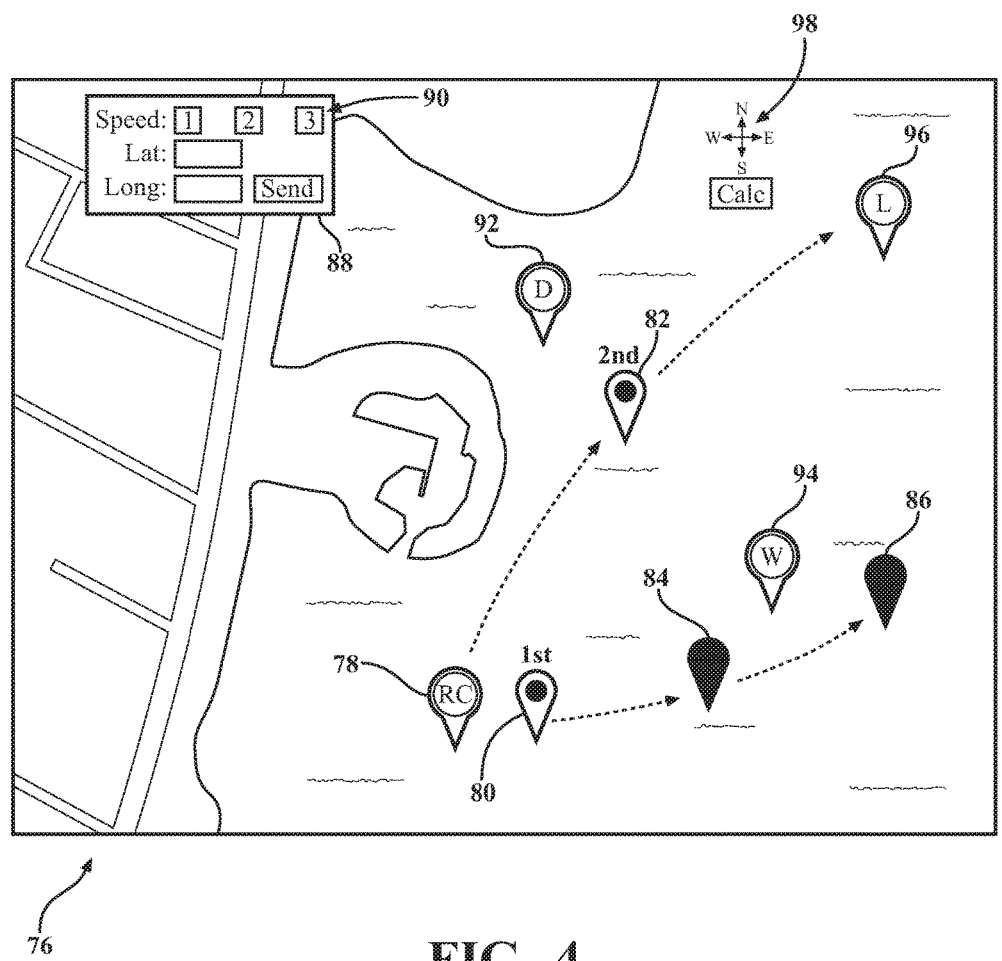
FIG. 4 is a screen shot of a buoy command website used in connection with the programmable buoy system of the present invention.

Referring now to FIGS. 1 and 4 the features of the programmable buoy system 10 and the operation of the buoy command interface application 28 are shown and described. FIG. 4 is a screenshot of a map 76 that can be brought up using the buoy command interface application 28 running on the personal computer 24 or a mobile device 26 such as a tablet or smart phone. The screenshot shows a map 76 of the current location of the personal computer 24 or mobile device 26 and the buoys 12, 12'. A race committee or RC mark 78 designates or defaults to the position of the device running the buoy command interface application 28, which is the personal computer 24 or mobile device 26. During sailboat racing events the starting line and finish line are typically located around a race committee which observes, times and regulates the sailboat race. Often the location of the race committee or in this case the RC mark 78 is one end of the start/finish line for the race. A current position first buoy mark 80 is shown on the map, which is the location of one of the buoys 12, 12' current position on the map. A current position second buoy mark 82 shows the location of a second one of one or more buoys 12, 12'. While two buoys are shown in the present example it is within the scope of this invention for a greater or lesser number of buoys to be controlled by the same buoy command interface application 28.

The user 22 can command each of the buoys 12, 12' individually by first selecting the current position first buoy mark 80 (which pertains to one of the buoys 12, 12') on the map 76 and then selecting a point on the map to set a first selected waypoint 84. A second selected waypoint 86 can also be set, which will cause the selected buoy to first go to the first selected waypoint 84 and then to the second selected waypoint 86 in sequence. It is within the scope of this invention for a greater or lesser number of waypoints to be used. The first selected waypoint 82 and the second selected waypoint 86 are sent through the Internet from the personal computer 24 or mobile device 26, via a wireless or hard-wired Internet connection, to the buoy command interface website 20 and then onto the computer 60 located on the buoy using the wireless network 14 connection. An alternate aspect of the invention includes a manual input window 88 located on the map 76 that allows latitude and longitude coordinates to be manually typed in and send as a waypoint for the buoy 12, 12'. Also the manual input window 88 provides speed control setting commands 90 that can be selected to a specific buoy. The speed control setting commands 90 are transmitted to the computer 60 on the buoy 12, 12' in the same way that the waypoint commands are sent. The computer 60 relays the speed control setting commands directly to the speed control actuator 72.

The screenshot in FIG. 4 also shows a dock marker 92 designated as "D" which is a pre-programmed waypoint representing a "dock" or location that all buoys under the users command can be directed to go to and wait to be removed from the water. The dock marker 92 provides the user 22 with a quick pre-programmed waypoint command that can be selected at the end of a race and eliminates the need to have workboats travelling all over the course picking up the race buoys. Instead the buoys are programmed to go directly to a dock or shoreline where they can be removed from the water.

Another feature of the buoy command interface application 28 is ability to the mobile device or personal computer to calculated a suggested windward waypoint 94 and suggested leeward waypoint 96. During this calculation an electronic compass application on the personal computer 24 or mobile device 26 is accessed by the buoy command interface application 28 when the user 22 selects a compass reading command 94, which is located in the manual input window 88. Just prior to selected in the compass reading command 94 the user 23 holds the personal computer 24 or mobile device in the direction of the wind so the buoy command interface application 28 will learn the wind direction. The buoy command interface application 28 will then calculate and show the suggested windward waypoint 94 and the suggested leeward waypoint 96 based on pre-input settings for the buoy command interface application. The pre-input settings are setting input by the user 22 with desired distances for the windward and leeward marks relative to the race committee position. The desired distances can be recorded as many different settings for different sailing conditions. For example one setting can be for light wind, which would call for a shorter course, while a second setting can be for heavy wind which would allow for a longer course. The user 22 can select the suggested waypoints or they can be set differently.

Figure 6:
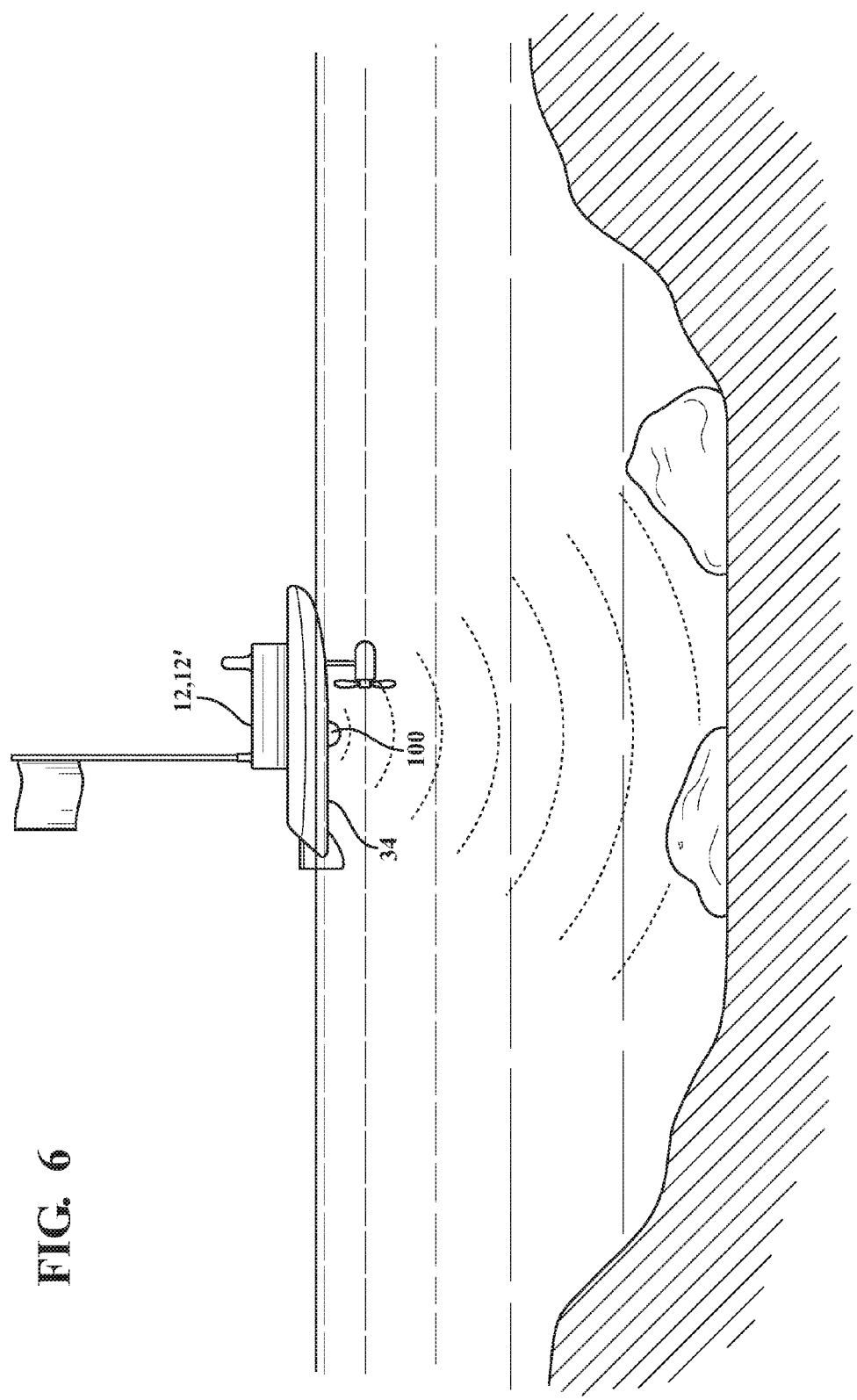
FIG. 6 is a cross-sectional side environmental view of the buoy navigating in a body of water in accordance with an alternate embodiment of the invention.

An alternative embodiment of the invention shown in FIG. 6, further includes using the programmable buoy system 10 to automatically create an underwater map of a body of water. In this particular embodiment a sonar module 100 is connected to the bottom side 34 of the buoy 12, 12'. When activated the sonar module 100 continuously sends sonar waves at set cycle times through the depths of the body of water in order to obtain depth readings. The computer 60 automatically logs and saves the data measurements or inputs received by the sonar module 100 and the global positioning controller 60, which provides current latitude and longitude readings. A user of the system may command one or more buoys to traverse a body of water in a grid like or other desired pattern in order to collect data using the sonar module. The readings obtained by this embodiment of the invention include a depth reading, latitude and longitude for the depth reading. The computer 60 the data which can then be retrieved and then processed in order to create a map of the body of water. The user interface website in the alternative embodiment of the invention can also include a map tool that will help or assist the user in setting waypoint grids for the one or more buoys over a specific two-dimensional surface area of the body of water.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A programmable buoy system comprising:
   one or more buoys each comprising:
   a hull having two or more pontoons, the hull having a top side and bottom side;
   a stationary rudder extending downward from the bottom side of the hull to be positioned in a body of water when the one or more buoys are in use;
   a motor contained in a motor housing that is pivotably connected to the buoy, wherein the motor has a propeller positioned away from the bottom side of the hull, wherein the propeller moves the one or more buoys in the body of water
   a shaft having a first end connected to the motor housing and a connection point on the one or more buoys, where the shaft, the motor housing with the motor and the propeller are configured to rotate about the axis of the shaft;
   a maximum motor height that is defined by the distance between the connection point and a bottom surface of the motor housing;
   a buoy height defined by the distance between the bottom surface of the two or more pontoons to a top surface of the two or more pontoons, wherein a ratio of the maximum motor height to the buoy height is one selected from the group consisting of at least 2:1, at least 2.25:1, at least 2.5:1, at least 2.75:1, at least 3.0:1, at least 3.25:1, at least 3.5:1, at least 3.75:1, at least 4.0:1, at least 4.25:1, at least 4.5:1, and at least 4.75:1;
   a global positioning controller connected to the motor, and having a communication port;
   a computer with a wireless internet communicator having an Internet connection using a wireless network, wherein the computer is hard wired to the communication port of the global positioning controller and the computer is configured to connect to the Internet through the wireless internet communicator for receiving one or waypoints, the one or more waypoints are stored and then inputted in a desired sequential order through the communication port to the global positioning controller, wherein the global controller uses a navigational system to navigate the one or more buoys to one or more waypoints in response to an input received at the communication port, wherein the global positioning controller also controls the movement of the select one of one or more buoys to maintain position at the one or more waypoints;

a power source connected to the computer, motor and global positioning controller;

a buoy command server connected to the Internet for hosting a buoy command website used to register the one or more buoys belonging to the user, and allows communicating the one or more waypoints to each of the one or more buoys by using the buoy command website to transmit the one or waypoints to the computer through the Internet using the wireless internet communicator and the mobile network; and a buoy command interface application on a mobile device that connects to the buoy command website on the buoy command server, wherein the interface application is used by a user to set and communicate the one or more waypoints to the buoy command website.

2. The programmable buoy of claim 1 wherein the global positioning controller stores only a single waypoint and will maintain position at last one of the one or more waypoints in the event failure of the wireless internet transmitter receiver.

3. The programmable buoy of claim 1 wherein the mobile device further includes an electronic compass application that is accessed by the buoy command interface application, wherein a user of the buoy command interface application directs the buoy command interface application to access the compass while the user holds the mobile device in the direction of the wind, the buoy command interface application then calculates one or more suggested waypoints for the one or more buoys.

4. The programmable buoy of claim 3 wherein the location of the mobile device running the buoy command interface application defaults to a race committee designation mark and the one or more suggested waypoints for the one or more buoys are preprogrammed distances distance from the race committee designation for a particular race.

5. The programmable buoy of claim 4 wherein the one or more waypoints, one or more suggested waypoints and the race committee designation mark each have a specific latitude and longitude.

6. The programmable buoy of claim 1 further comprising a preprogrammed dock waypoint programmed into the buoy command interface application that a user can select and command the one or more buoys to travel to, wherein the dock waypoint is a specific latitude and longitude.

7. The programmable buoy of claim 1 further comprising a sonar system connected each one or more buoys, wherein the sonar system is connected to the power source and receives commands from the computer, which are received through the buoy command server, wherein the sonar, when activated continuously transmits depth data to the computer which then records the depth at a specific waypoint; and wherein the buoy command server or the buoy command interface application commands the one or more buoys to activate the sonar and travel a select path.

8. The programmable buoy of claim 1 further comprising an actuator connected to the shaft, the computer and the power source, wherein the actuator raises and lowers the shaft to adjust the motor height in response to a command from the computer to the actuator.

9. The programmable buoy of claim 1 wherein each of the one or more buoys has a vessel volume one selected from the group consisting of less than 0.90 m$^3$, less than 0.80 m$^3$, less than 0.70 m$^3$, less than 0.60 m$^3$, less than 0.50 m$^3$, and less than 0.40 m$^3$.

10. A programmable buoy system comprising:
one or more buoys each comprising:
a hull having two or more pontoons, the hull having a top side and bottom side;
a stationary rudder extending downward from the bottom side of the hull to be positioned in a body of water when the one or more buoys are in use;
a motor contained in a motor housing that is pivotably connected to the buoy, wherein the motor has a propeller positioned away from the bottom side of the hull, wherein the propeller moves the one or more buoys in the body of water;
a shaft having a first end connected to the motor housing and a connection point on the one or more buoys, where the shaft, the motor housing with the motor and the propeller are configured to rotate about the axis of the shaft;
a maximum motor height that is defined by the distance between the connection point and a bottom surface of the motor housing;
a buoy height defined by the distance between the bottom surface of the two or more pontoons to a top surface of the two or more pontoons, wherein a ratio of the maximum motor height to the buoy height is one selected from the group consisting of at least 2:1, at least 2.25:1, at least 2.5:1, at least 2.75:1, at least 3.0:1, at least 3.25:1, at least 3.5:1, at least 3.75:1, at least 4.0:1, at least 4.25:1, at least 4.5:1, and at least 4.75:1;
a global positioning controller connected to the motor, and having a communication port;
a computer with a wireless internet communicator having an Internet connection using a wireless network, wherein the computer is hard wired to the communication port of the global positioning controller and the computer is configured to connect to the Internet through the wireless internet communicator for receiving one or waypoints, the one or more waypoints are stored and then inputted in a desired sequential order through the communication port to the global positioning controller, wherein the global controller uses a navigational system to navigate the one or more buoys to one or more waypoints in response to an input received at the communication port, wherein the global positioning controller also controls the movement of the select one of one or more buoys to maintain position at the one or more waypoints and will maintain position at last one of the one or more waypoints in the event failure of the wireless internet transmitter receiver;
a power source connected to the computer, motor and global positioning controller;
a buoy command server connected to the Internet for hosting a buoy command website used to register the one or more buoys belonging to the user, and allows communicating the one or more waypoints to each of the one or more buoys by using the buoy command website to transmit the one or waypoints to the computer through the Internet using the wireless internet communicator and the mobile network; and
a buoy command interface application on a mobile device that connects to the buoy command website on the buoy command server, wherein the interface application is used by a user to set and communicate the one or more waypoints to the buoy command website.

11. The programmable buoy of claim 10 wherein the mobile device further includes an electronic compass application that is accessed by the buoy command interface application, wherein a user of the buoy command interface application directs the buoy command interface application to access the compass while the user holds the mobile device in the direction of the wind, the buoy command interface application then calculates one or more suggested waypoints for the one or more buoys.

12. The programmable buoy of claim 11 wherein the location of the mobile device running the buoy command interface application defaults to a race committee designation mark and the one or more suggested waypoints for the one or more buoys are preprogrammed distances distance from the race committee designation for a particular race.

13. The programmable buoy of claim 12 wherein the one or more waypoints, one or more suggested waypoints and the race committee designation mark each have a specific latitude and longitude.

14. The programmable buoy of claim 10 further comprising a preprogrammed dock waypoint programmed into the buoy command interface application that a user can select and command the one or more buoys to travel to, wherein the dock waypoint is a specific latitude and longitude.

15. The programmable buoy of claim 10 further comprising an actuator connected to the shaft, the computer and the power source, wherein the actuator raises and lowers the shaft to adjust the motor height in response to a command from the computer to the actuator.

16. The programmable buoy of claim 10 wherein each of the one or more buoys has a vessel volume one selected from the group consisting of less than 0.90 m$^3$, less than 0.80 m$^3$, less than 0.70 m$^3$, less than 0.60 m$^3$, less than 0.50 m$^3$, and less than 0.40 m$^3$.

17. A programmable buoy system comprising: one or more buoys each comprising:
a hull having two or more pontoons, the hull having a top side and bottom side;
a stationary rudder extending downward from the bottom side of the hull to be positioned in a body of water when the one or more buoys are in use;
a motor contained in a motor housing that is pivotably connected to the buoy, wherein the motor has a propeller positioned away from the bottom side of the hull, wherein the propeller moves the one or more buoys in the body of water;
a shaft having a first end connected to the motor housing and a connection point on the one or more buoys, where the shaft, the motor housing with the motor and the propeller are configured to rotate about the axis of the shaft;
a maximum motor height that is defined by the distance between the connection point and a bottom surface of the motor housing;
a buoy height defined by the distance between the bottom surface of the two or more pontoons to a top surface of the two or more pontoons, wherein a ratio of the maximum motor height to the buoy height is one selected from the group consisting of at least 2:1, at least 2.25:1, at least 2.5:1, at least 2.75:1, at least 3.0:1, at least 3.25:1, at least 3.5:1, at least 3.75:1, at least 4.0:1, at least 4.25:1, at least 4.5:1, and at least 4.75:1;
a global positioning controller connected to the motor, and having a communication port;
a computer with a wireless internet communicator having an Internet connection using a wireless network, wherein the computer is hard wired to the communication port of the global positioning controller and the computer is configured to connect to the Internet through the wireless internet communicator for receiving one or waypoints, the one or more waypoints are stored and then inputted in a desired sequential order through the communication port to the global positioning controller, wherein the global controller uses a navigational system to navigate the one or more buoys to one or more waypoints in response to an input received at the communication port;
a power source connected to the computer, motor and global positioning controller;
a buoy command server connected to the Internet for hosting a buoy command website used to register the one or more buoys belonging to the user, and allows communicating the one or more waypoints to each of the one or more buoys by using the buoy command website to transmit the one or waypoints to the computer through the Internet using the wireless internet communicator and the mobile network; and
a buoy command interface application on a mobile device that connects to the buoy command website on the buoy command server, wherein the interface application is used by a user to set and communicate the one or more waypoints to the buoy command website, wherein the mobile device further includes an electronic compass application that is accessed by the buoy command interface application, wherein a user of the buoy command interface application directs the buoy command interface application to access the compass while the user holds the mobile device in the direction of the wind, the buoy command interface application then calculates one or more suggested waypoints for the one or more buoys.

18. The programmable buoy of claim 17 wherein the global positioning controller stores only a single waypoint and will maintain position at last one of the one or more waypoints in the event failure of the wireless internet transmitter receiver.

19. The programmable buoy of claim 17 wherein the location of the mobile device running the buoy command interface application defaults to a race committee designation mark and the one or more suggested waypoints for the one or more buoys are preprogrammed distances distance from the race committee designation for a particular race, wherein the one or more waypoints, one or more suggested waypoints and the race committee designation mark each have a specific latitude and longitude.

20. The programmable buoy of claim 17 further comprising a preprogrammed dock waypoint programmed into the buoy command interface application that a user can select and command the one or more buoys to travel to, wherein the dock waypoint is a specific latitude and longitude.

21. The programmable buoy of claim 17 further comprising an actuator connected to the shaft, the computer and the power source, wherein the actuator raises and lowers the shaft to adjust the motor height in response to a command from the computer to the actuator.

22. The programmable buoy of claim 17 wherein each of the one or more buoys has a vessel volume one selected from the group consisting of less than 0.90 m$^3$, less than 0.80 m$^3$, less than 0.70 m$^3$, less than 0.60 m$^3$, less than 0.50 m$^3$, and less than 0.40 m$^3$.

* * * * *